United States Patent [19]

Araki

[11] 4,312,579
[45] Jan. 26, 1982

[54] MECHANISM TO CORRECT PROGRAMMED EXPOSURE VALUES IN ACCORDANCE WITH OBJECT CONDITIONS

[75] Inventor: Yoshitaka Araki, Tokyo, Japan

[73] Assignee: Nippon Kogaku K.K., Tokyo, Japan

[21] Appl. No.: 160,163

[22] Filed: Jun. 17, 1980

[30] Foreign Application Priority Data

Jun. 21, 1979 [JP] Japan .................................. 54-78541

[51] Int. Cl.³ ............................................... G03B 7/20
[52] U.S. Cl. .................................. 354/29; 354/60 R; 354/286
[58] Field of Search .................. 354/286, 202, 29, 36, 354/37, 38, 39, 43, 60 R; 350/282; 352/141

[56] References Cited

FOREIGN PATENT DOCUMENTS 2922021 6/1979 Fed. Rep. of Germany ...... 354/286

Primary Examiner—L. T. Hix
Assistant Examiner—Stafford D. Schreyer
Attorney, Agent, or Firm—Fitzpatrick, Cella, Harper & Scinto

[57] ABSTRACT

There is disclosed a mechanism for correcting programmed exposure values in a camera, the mechanism including a program exposure control device capable of correcting an exposure program in dependence upon the type of interchangeable lens and the condition of an object to be photographed.

3 Claims, 5 Drawing Figures

MECHANISM TO CORRECT PROGRAMMED EXPOSURE VALUES IN ACCORDANCE WITH OBJECT CONDITIONS

BACKGROUND OF THE INVENTION

1. Field of the Invention

This invention relates to a camera having an exposure control device, and more particularly to an interchangeable lens type camera having a program exposure control device capable of correcting the exposure program depending on the type of the interchangeable lens and the condition of an object to be photographed.

2. Description of the Prior Art

In interchangeable lens type cameras, various devices for effecting programmed exposure control have been devised. In such devices, as compared with fixed lens type cameras, there is a merit that the range of usage is widened by utilization of interchangeable lenses and various adapters while, on the other hand, there is a demerit that unless the correction of the exposure program is effected in compliance with the case where the type of the lens used and the object to be photographed differ, the combination of the shutter time and the aperture value is primarily determined by the program and thus these characteristics cannot sufficiently be availed of. Such inconvenience would become greater particularly in cameras exclusively of the programmed exposure control type which are not provided with a plurality of different exposure control modes such as the so-called shutter speed priority automatic exposure, the aperture priority automatic exposure and the manual exposure control using the manual setting.

SUMMARY OF THE INVENTION

The present invention intends to overcome these disadvantages and to provide a program exposure control device in a camera which effects correction of the program by identification of the type of an interchangeable lens such as the open aperture value (or the minimum aperture value) and focal length thereof and in which an exposure control program correcting mechanism operable from outside of the camera is further provided to enlarge the photographing range and at the same time, such correcting mechanism is mechanically or electrically associated with the program correcting mechanism from the interchangeable lens side to provide an exposure program correcting device operable from outside of the camera in accordance with the conditions of an object to be photographed, and yet to provide such a device by a simple construction and at low cost and high accuracy.

The invention will become fully apparent from the following detailed description of some embodiments thereof taken in conjunction with the accompanying drawings.

DESCRIPTION OF THE PREFERRED EMBODIMENTS

Figure 1:
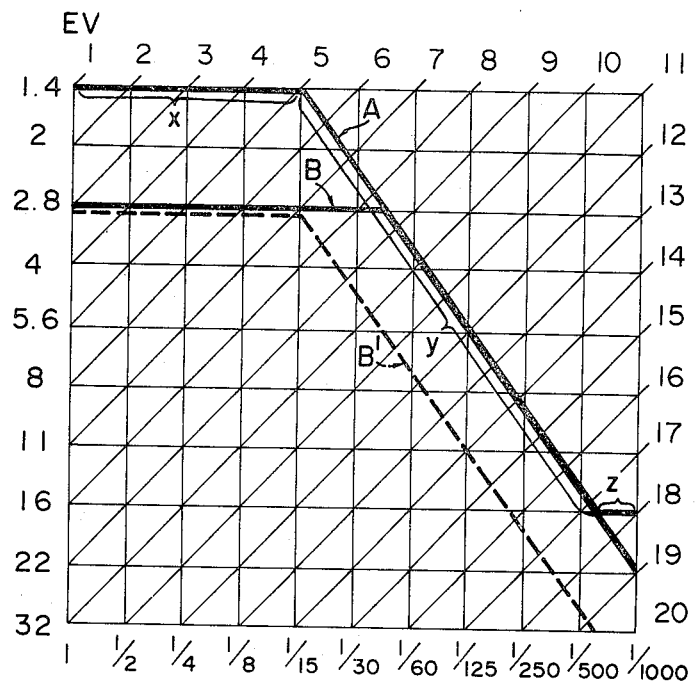
FIG. 1 is a program diagram showing the programs of the shutter speed and aperture in a case where the correction by a program correcting member operable from outside of the camera is not effected.

FIG. 1 is a program diagram showing the normal case where correction is not effected of the programs of the shutter speed and aperture according to an embodiment of the present invention. In FIG. 1, programs of a lens having an open aperture diameter of F1.4 and a minimum aperture diameter of F16 (hereinafter referred to as the lens A) and a lens having an open aperture diameter F2.8 and a minimum aperture diameter of F32 (hereinafter referred to as the lens B) are shown as typical examples. (The word "programs" herein used means characteristics of a combination of a shutter speed and aperture value corresponding to the brightness of the object for each interchangeable lens, that is, the characteristics as indicated by curves A and B in FIG. 1.) The program curve of the lens B shown in FIG. 1 is one corrected by the open aperture value of an interchangeable lens (in the case of the lens B, F2.8) such that the program curves are identical in the common range of the program and aperture diameter of the lens A, and the program curve in a case where correction is not effected is shown as a broken line B'. The correction of the program corresponding to the open aperture value of an interchangeable lens is for the purpose of eliminating the inconvenience that for several types of lenses having the same focal length but different in open aperture value or several types of lenses having relatively approximate focal lengths or picture-taking areas but different in open aperture value, the programs differ from each other due to the differences between the lenses in the range in which the adjustmemt by the aperture is possible (the rightwardly downwardly extending portion of the curve shown).

Figure 2:
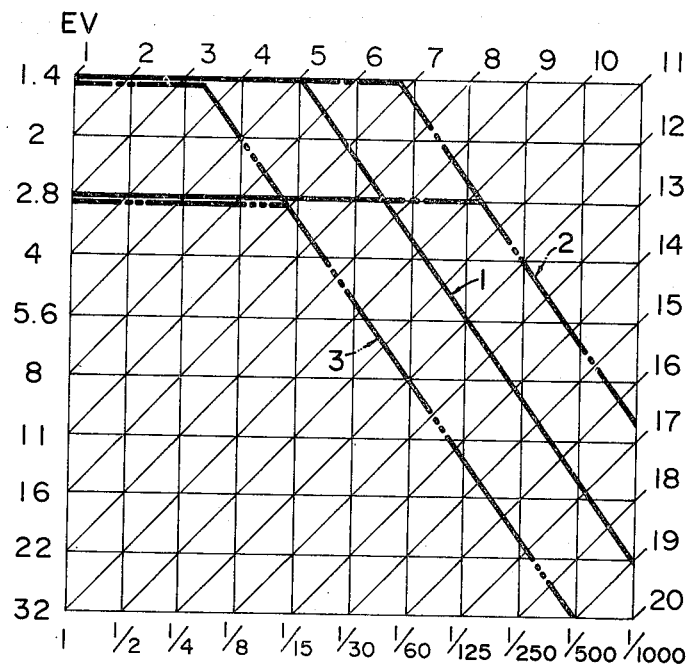
FIG. 2 is a program diagram showing a case where the correction by the program correcting member has been effected.

The program diagram of FIG. 2 shows, by a dot-and-dash line (program 2) and dots-and-dash line (program 3), respectively, the cases where by manually operating a program correcting member provided externally of a camera in accordance with the photographing purpose in the embodiment of the present invention, the exposure control program has been corrected from the basic program 1 such that the combination of the shutter speed and aperture value for the same object brightness becomes a combination of a one-stage higher shutter speed and a one-stage greater aperture diameter (program curve 2 of FIG. 2) or a combination of a one-stage smaller aperture diameter and a one-stage lower shutter speed (program curve 3 of FIG. 2).

The program diagrams of FIGS. 1 and 2 are respectively divided into three portions, namely, a portion in which in spite of increased Ev, the aperture remains to be an open aperture diameter and only the shutter speed varies (hereinafter referred to the portion x), a portion in which with a variation in Ev, in the intermediate stage between the open aperture and the minimum aperture, both of the aperture value and the shutter speed vary (hereinafter referred to as the portion y), and a portion in which the aperture remains to be a minimum aperture diameter and only the shutter speed varies (hereinafter referred to as the portion Z).

In the present invention, the portions y of the lenses A and B overlap each other as shown in FIG. 1. Accordingly, even if the open aperture diameter differs from one lens to another, it is always possible to obtain a combination of the same shutter speed and aperture value for the same Ev in the portion y. It is now tried to derive an equation of the portion y. For simplicity, APEX indication (A, Tv, Ev, Bv, Sv) is used in the equation.

The equation of the portion y is generally expressed as $$Tv = \alpha Av + \gamma \quad (1)$$

where $\alpha$ and $\gamma$ are constants.

By introducing an equation of proper exposure of the APEX indication $$Av + Tv = Bv + Sv$$

and thereby transforming equation (1), there is obtained:

$$Tv = \frac{\alpha}{1+\alpha}(Bv + Sv) + \frac{\gamma}{1+\alpha} \quad (2)$$

Thus, the shutter speed Tv controlled by the object brightness Bv measured by a light-receiving element is determined.

However, in TTL metering, it is impossible to measure Bv itself and the metering output from the light-receiving element is information including the open diameter Avo of the interchangeable lens, namely, information Bv-Avo. Accordingly, when this is intactly substituted for Bv in equation (2), there is obtained $$Tv = \frac{\alpha}{1+\alpha}(Bv - Avo + Sv) + \frac{\gamma}{1+\alpha} \quad (3)$$

and even for the same object brightness (the same Bv value) and the same film speed (the same Sv value), Tv differs in accordance with the open diameter Avo of the interchangeable lens. When Tv differs, proper exposure is nothe same Ev) differs due to Avo of the interchangeable lens and thus, the portion y of the program diagram does not become a single line as shown by the program curves A and B' of FIG. 1 but becomes two oblique lines parallel to each other for the lenses A and B and spaced apart from each other by a predetermined amount proportional to the difference of Avo (the difference is 2 because the lens A and is Av1 and the lens B is Av3). In the present invention, the information on the open aperture diameter of the individual lenses is introduced into equation (3) to obtain $$Tv = \frac{\alpha}{1+\alpha}(Bv + Sv - Avo) + \frac{1}{1+\alpha} \quad (4)$$

$$(\alpha Avo + \gamma)$$

and thereby eliminate the influence of the open aperture diameter Avo. That is, depending on the open aperture diameter of the lens, the different portions y are parallel-moved in the direction of the Tv axis so as to overlap each other on a single line and this equation is one from which a shutter speed lying on the straight line of the portion y of the program of FIG. 1 for a given object brightness, film speed and open diameter of the lens and suited to the condition of proper exposure may be calculated.

Since the portions x and z are areas in which any further control (variation) of the aperture is impossible, only the shutter speed in the program diagram varies for a variation in Ev value and it will be automatically determined if the gradient of the portion y is determined. Accordingly, it is not necessary to obtain equations of the portions x and z.

A circuit portion and its operation will now be described.

Figure 3:
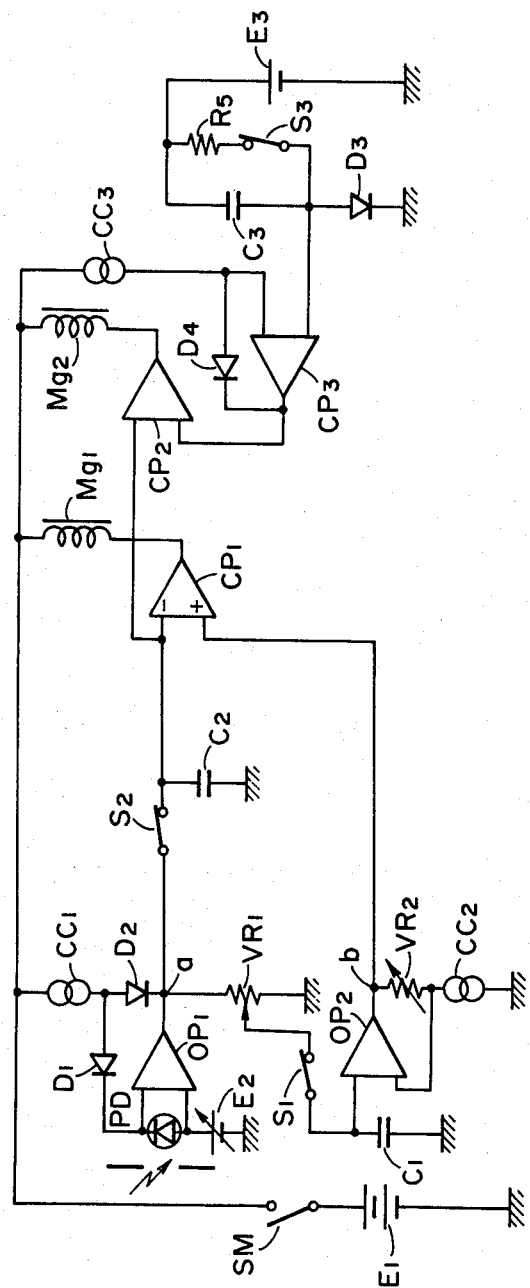
FIG. 3 is a diagram of a circuit which is an embodiment of the present invention.

FIG. 3 shows an embodiment of the circuit portion. A photodiode PD for receiving the object light passed through the aperture of the lens, diodes $D_1$, $D_2$, a constant current source $CC_1$, an amplifier $OP_1$ and a variable constant voltage $E_2$ for setting the film speed information together constitute a TTL metering circuit. The metering output thereof represents a shutter speed corresponding to the brightness of the object and the open aperture value and appears at an output terminal a. Variable resistors $VR_1$, $VR_2$, a switch $S_1$ adapted to be opened immediately before the stop-down of the lens, a capacitor $C_1$, and amplifier $OP_2$ and a constant current source $CC_2$ together constitute a program setting circuit. The resistance ratio of the variable resistor $VR_1$ corresponds to $$\frac{\alpha}{1+\alpha}$$

of equation (4), and the resistance value of the variable resistor $VR_2$ is set to a predetermined value so as to represent $$\frac{1}{1+\alpha}(\alpha Avo + \gamma)$$

of equation (4). That is, the variable resistors $VR_1$ and $VR_2$ determine the gradient of the portion y in the program diagrams of FIGS. 1 and 2. The program output thereof appears at an output terminal b. A switch $S_2$ and a capacitor $C_2$ together constitute a memory circuit, and the charging voltage of the capacitor $C_2$ provides a memory output. A comparator $CP_1$ for comparing the program output with the memory output and an electromagnet $Mg_1$ for stopping the stop-down operation constitute an aperture control device. Comparators $CP_2$, $CP_3$, diodes $D_3$, $D_4$, a capacitor $C_3$, a resistor $R_5$, a trigger switch $S_3$, a constant current source $CC_3$ and an electromagnet $Mg_2$ together constitute a shutter speed control device.

Now, when a shutter button is depressed, a main switch SM is closed at a first stage to permit a current to be supplied from a power source battery $E_1$ to the entire circuit system. The photodiode PD receives the light passed through the lens and aperture and produces a photocurrent proportional to the intensity of that light. This photocurrent is logarithmically compressed by the amplifier $OP_1$ and diode $D_1$. The constant current source $CC_1$ and the diode $D_2$ are for compensating for the temperature characteristic of the diode $D_1$. At this stage, the aperture of the lens is still open. Accordingly, the light impinging on the photodiode PD is the object light minus the information on the open aperture diameter of the lens and therefore, the logarithmically compressed value thereof, if expressed in APEX indication, is $(Bv-Avo)$. Since a voltage corresponding to the film speed information Sv is applied to the amplifier $OP_1$ by the variable constant voltage circuit $E_2$, the voltage $V_A$ at the output terminal a of the amplifier $OP_1$ is $$V_A=(Bv+Sv-Avo) \qquad (5)$$

This voltage at the point a is divided by the variable resistor $VR_1$. Since this resistance ratio is set so as to be $$\frac{\alpha}{1+\alpha}$$

of equation (4), the divided voltage is $$\frac{\alpha}{1+\alpha}(Bv+Sv-Avo).$$

This voltage is applied through the switch $S_1$ to the amplifier $OP_2$, where the information $$\frac{1}{1+\alpha}(\alpha Avo+\gamma)$$

is added to this voltage by the constant current source $CC_2$ and the variable resistor $VR_2$, as a result of which the voltage $V_B$ at the output terminal b of the amplifier $OP_2$ becomes $$V_B = \frac{\alpha}{1+\alpha}(Bv+Sv-Avo)+\frac{1}{1+\alpha}(\alpha Avo+\gamma) \qquad (6)$$

and this corresponds to $T_V$ of equation (4).

As described above, $V_{R2}$ in FIG. 3 is a variable resistor which effects the setting of the program curve, and upon mounting of an interchangeable lens on the camera, this variable resistor varies its resistance value in response to a pin or the like provided on each individual lens and in accordance with the respective open aperture diameters and acts to cause the portion y of the program diagram to overlap as shown in FIG. 1 even if the open aperture differs from one interchangeable lens to another. Further, in the present invention, $VR_2$ may be varied in response to a later described operating member provided on the exterior of the camera, whereby the program curve may be corrected from 1 to 2 or 3 as shown in FIG. 2. That is, $VR_2$ by varying its resistance value acts to vary Avo and $\gamma$ of the second term $$\frac{1}{1+\alpha}(\alpha Avo+\gamma)$$

of equation (6) by the signal from the interchangeable lens and the setting of the program correcting operating member, respectively.

Next, when the shutter button is further depressed to a second stage, the aperture and shutter speed are controlled in accordance with the program diagram, and this will be described with respect to the portions x, y and z in the named order.

First, with the EV value being in the condition of the portion x, if the portion y of the program diagram is followed, the aperture will become greater than the open diameter of the lens and therefore, the shutter speed providing a proper exposure for the open diameter of the lens will necessarily be varied correspondingly to the EV value. That is, when the shutter button is depressed to the second stage, the voltage $V_B$ exhibits a proper TV value for an open diameter whose AV value is greater than the open diameter of the lens following the gradient of the portion y and thus, is greater than the voltage $V_A$ exhibiting a proper TV value for the open diameter of the lens and as a result, the output of the comparator $CP_1$ assumes H level in a moment to cut off the supply of current to the electromagnet $Mg_1$ which has so far been energized and operate a stop-down preventing mechanism, not shown, thereby preventing the stop-down of the lens by an automatic stop-down mechanism. In all cases, after a sufficient time to control the aperture has elapsed, the switch $S_2$ is opened and the voltage $V_A$ is stored in the capacitor $C_2$.

Thereafter, when the mirror has been moved up and the shutter is released, the trigger switch $S_3$ is opened at a point of time whereat the forward shutter curtain starts to run, whereby a time logarithm converting circuit constituted by an amplifier $OP_3$, a constant voltage circuit $E_3$, a capacitor $C_3$, diodes $D_3$, $D_4$, a resistor $R_5$ and a constant current source $CC_3$ starts to operate. This circuit puts out a voltage corresponding to the TV value for the exposure time from after the forward shutter curtain has started to run. If the voltage corresponding to this TV value is coincident with the voltage $V_A$ stored in the capacitor $C_2$, the comparator $CP_2$ will operate and the electromagnet $Mg_2$ will be deenergized to permit the rearward shutter curtain to start to run.

Next, with the EV value being in the condition of the portion y, when the shutter button is depressed to the second stage, the aperture of the lens is stopped down by the automatic stop-down mechanism, but immediately before that, the switch $S_1$ is opened and the divided voltage of the variable resistor $VR_1$ is stored in the capacitor $C_1$ and the voltage $V_B$ is fixed. As the aperture is stopped down with time, the quantity of light impinging on the photodiode PD becomes the object brightness minus the information of the aperture actually stopped down at each point of time. Therefore, the output voltage $V_A$ of the amplifier $OP_1$ becomes $(Bv+Sv-AV)$, which represents the TV value suited to the proper exposure condition corresponding to from-time-to-time aperture information. The voltage $V_A$ is compared with the voltage $V_B$ by the comparator $CP_1$. At a point of time whereat the voltage $V_A$ becomes coincident with the voltage $V_B$, the output of the comparator $CP_1$ assumes H level. Therefore, the current which has so far flowed to the electromagnet $Mg_1$ is cut off, whereby the stopdown preventing mechanism, not shown, operates to stop the stop-down operation. In all cases, after a sufficient time to control the aperture has elapsed, the switch $S_2$ is opened and the voltage $V_A$ is stored in the capacitor $C_2$. The operation thereafter is the same as the aforementioned shutter speed control operation in the portion x.

Lastly, with the EV value being in the condition of the portion z, when the portion y is followed, there occurs the case where the aperture is stopped down more than the minimum aperture diameter and therefore, the proper shutter speed for the minimum aperture diameter of the lens is necessarily varied correspondingly to the Ev value. That is, when the shutter button is depressed to the second stage, the aperture is stopped down to the minimum aperture and yet, the voltage $V_B$ does not become higher than $V_A$ and thus, the comparator $CP_1$ continues to put out L level output. Accordingly, the stop-down preventing mechanism does not operate. Thereafter, when the switch $S_2$ is closed, the voltage $V_A$ is stored in the capacitor $C_2$ and thereafter, the shutter speed is controlled in accordance with this voltage $V_A$, as previously described.

In the above-described embodiment, the so-called momentary stop-down metering in which the output of the TTL metering circuit including from-time-to-time information of the aperture value is obtained in the course of the stop-down operation of the lens is used as the means for controlling the aperture, whereas the present invention is not restricted thereto, but the same effect may also be obtained, for example, by using means for controlling the aperture by the stored information of the metering circuit and the aperture value information obtained by a variable resistor, a digital encoder or the like operatively associated with the aperture preset ring or the like, or by using means for converting the deflection of the needle of an ammeter deflected by the output of the metering circuit into a staircase-like can stroke and controlling the aperture in accordance therewith.

Figure 4:
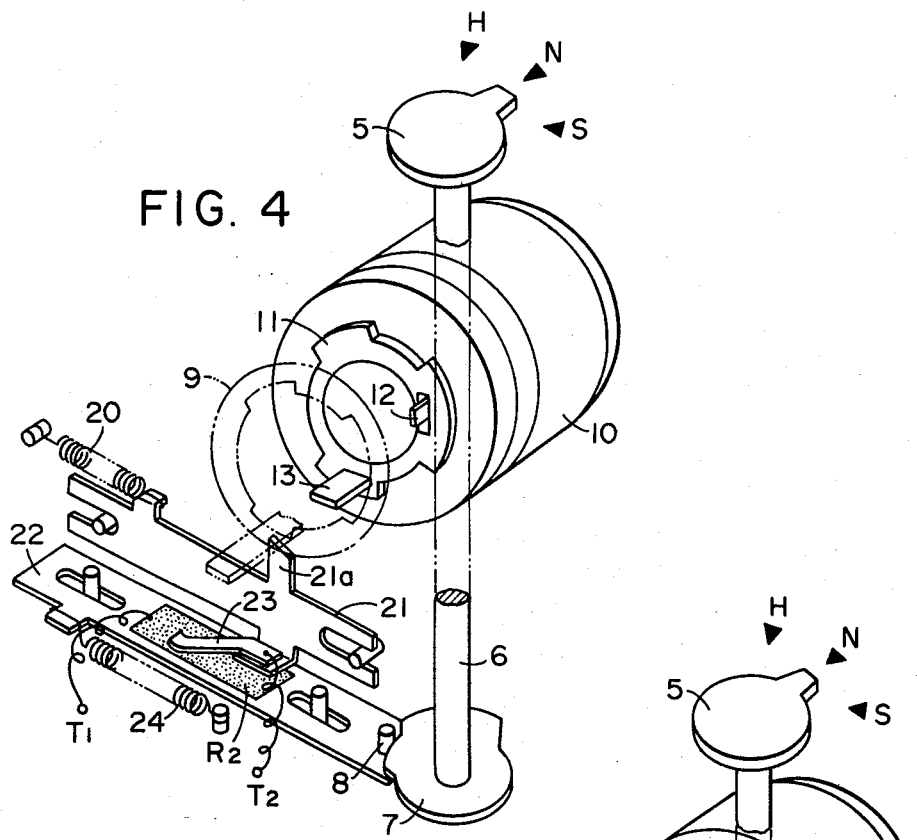
FIG. 4 shows a first embodiment of the interlocking device for varying the resistance value of a variable resistor $VR_2$ shown in FIG. 3.

FIG. 4 shows a first embodiment of the interlocking device for varying the resistance value of the variable resistor $VR_2$ shown in FIG. 3. An interchangeable lens 10 has a lens mount 11 coupled to a body mount 9 provided on the camera body, an automatic aperture lever 12 positioned intermediate a diaphragm vane and the automatic stop-down mechanism on the camera side and operatively associated with said mechanism to stop down the aperture, and an information transmitting member 13. The position at which the information transmitting member 13 is provided or the size thereof is made to differ depending on the open aperture diameter and type of the interchangeable lens.

On the camera body side, there is provided a slide lever 21 biased in one direction by a spring 20, and a slide plate 22 having a resistor $R_2$ formed thereon and biased in one direction by a spring 24. Projectedly formed on the slide lever 21 is an information receiving member 21a opposed to the lens mounting opening of the body side mount 9. Secured to the slide plate 22 is a positioning pin 8 which contacts a correcting cam 7 coupled to a program correcting lever 5 provided in the upper portion of the camera.

A brush 23 slidable on the resistor is provided on the slide lever 21, and the brush 23 and the resistor $R_2$ together constitute the variable resistor $VR_2$ of FIG. 3 and a necessary resistance value is obtained between terminals $T_1$ and $T_2$.

Now, to mount the lens 10 on the camera body, a bayonet mount 11 is inserted into the mount of the camera and rotated counter-clockwisely. At this time, the information transmitting member 13 engages the information receiving member 21a projectedly formed on the slide lever 21. When the lens is rotated counter-clockwisely, the slide lever 21 slides rightwardly as viewed in FIG. 4 and in response thereto, the brush 23 slides on the resistor $R_2$. When this mounting operation is completed and the rotation of the lens is stopped, the sliding movement of the slide lever 21 is also stopped.

Where, at this time, the program correcting lever 5 on the camera body side is set to the position of an index mark N for setting the standard program, the slide plate 22 is controlled by the pin 8 and cam 7 to a position for generating between terminal $T_1$ and $T_2$ a resistance value corresponding to the correction information from the lens side.

Further, during photography, the program correcting lever is rotated, in accordance with the object, to an index mark position H whereat the combination of programs makes the shutter speed higher than the standard program and effects the correction for opening the aperture diameter (the program 2 of FIG. 2) or an index mark position S whereat the combination of programs makes the shutter speed lower and effects the correction for stopping down the aperture diameter (the program 3 of FIG. 2), whereby the slide plate 22 moves in accordance with the position of the pin 8 contacting the correcting cam 7, to vary the relative position of the slidable brush 23 and the resistor $R_2$, so that the resistance between the terminals $T_1$ and $T_2$ assumes a value corresponding to the correction of the program.

Thus, the value of the variable resistor $VR_2$ constituted by the resistor $R_2$ and the slidable brush 23 is a combined value of the information on the open aperture diameter or the like of the interchangeable lens and the program correcting information set from outside of the camera, and contributes to the achievement of the program shown in FIG. 2.

In the embodiment shown in FIG. 4, with only $VR_2$ as the resistor varied by the interchangeable lens and program correcting member, the variation in program curve is represented by the parallel movement of the portion y as shown in FIGS. 1 and 2, but the variable resistor $VR_1$ may likewise be varied in response to one or both of the correction signal members to thereby correct the gradient of the portion y of the program curve (the variation ratio of the shutter time to the aperture value).

Figure 5:
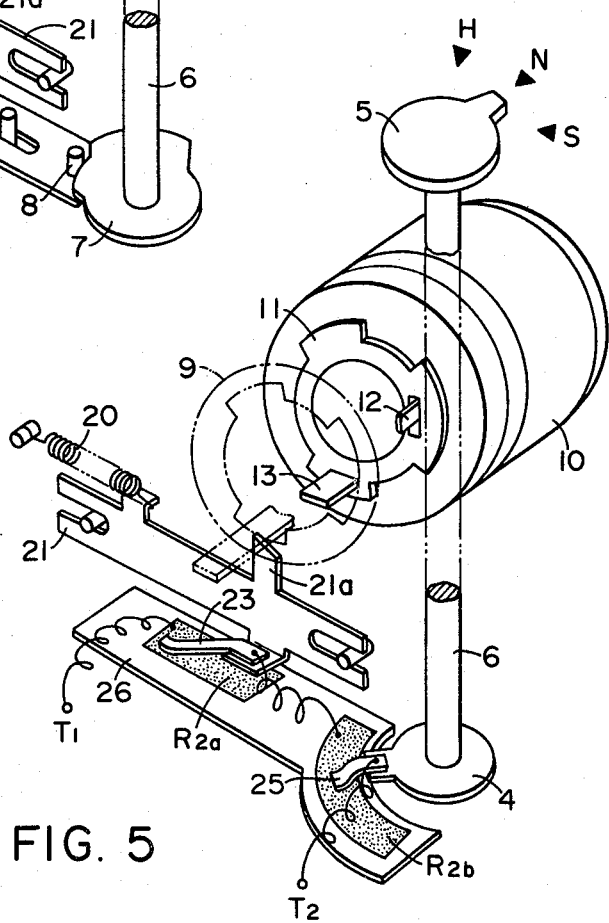
FIG. 5 shows a second embodiment of the interlocking device for varying the resistance value of the variable resistor $VR_2$ shown in FIG. 3.

FIG. 5 shows a second embodiment of the interlocking device for varying the resistance value of the variable resistor $VR_2$ shown in FIG. 3. As in the first embodiment, the position of the slidable brush provided on the slide lever 21 is determined by the position of the information transmitting member 13 of the interchangeable lens 10. Further, the position of a slidable brush 25 operatively associated with the program correcting lever 5 is determined by the set position of such lever 5. These two slidable brushes 23, 25 and resistors $R_{2a}$, $R_{2b}$ together constitute the variable resistor $VR_2$ of FIG. 3. Variable resistors $VR_{2a}$ and $VR_{2b}$ independently constituted by the brush 23 and the resistor $R_{2a}$ and by the brush 25 and the resistor $R_{2b}$, respectively, are connected in series ancorrect Avo and $\gamma$, respectively, of the second term of equation (6). Accordingly, in this embodiment, the program correcting information by the interchangeable lens and the correcting information by the program correcting lever need not always be mechanically associated with each other and this lead to the advantages that the degree of freedom of the arrangement and space within the camera is increased and that individual adjustments become easy. Also, $VR_{2a}$ may be replaced by electrical resistors individually provided in the lens. Further, these devices are not restricted to the so-called analog operational circuit using a resistor-brush combination, but are also applicable to a digital operational circuit using a digital slidable pattern-brush combination.

I claim:

1. In a camera of the interchangeable lens type having a program exposure control device which is so programmed that a combination of shutter speed and aperture value may be determined according to the brightness of the object to be photographed and film speed and a lens mount; and an interchangeable lens detachably mounted on said body through said mount, the improvement comprising:

(a) program varying means provided in said program exposure control device, the program of said program exposure control device being capable of being arbitrarily selected by the setting of said program varying means;

(b) information means provided on said interchangeable lens, the information possessed by said information means corresponding to the main usage of photography of the lens;

(c) interlock means for setting said program varying means so that when said interchangeable lens is mounted on said body, said program varying means selects a program corresponding to the information possessed by said information means; and (d) manually operable correcting means on said camera for correcting said program varying means to vary the program of said program exposure control device.

2. A camera according to claim 1, wherein said information means possesses said information as a mechanical quantity, said interlock means includes a moveable member displaceable by said information means in response to the mounting of said interchangeable lens onto said camera, said program varying means includes means for converting the amount of displacement of said movable member into an electrical output, and said correcting means includes means for separately displacing said movable member for said correction.

3. A camera according to claim 1, wherein said information means possesses said information as a mechanical quantity, said interlock means includes a movable member displaceable by said information means in response to the mounting of said interchangeable lens onto said camera, said program varying means includes means for converting the amount of displacement of said movable member into an electrical output, and said correcting means includes means for combining the electrical output for said correction with said converted electrical output.

* * * * *

UNITED STATES PATENT AND TRADEMARK OFFICE
CERTIFICATE OF CORRECTION

PATENT NO. : 4,312,579
DATED : January 26, 1982
INVENTOR(S) : ARAKI, YOSHITAKA

It is certified that error appears in the above—identified patent and that said Letters Patent is hereby corrected as shown below:

Column 3, line 45, "nothe" should be --not the--; same line, between "not" and "the" insert
--obtained unless Av also varies correspondingly and as a result, the combination of Tv and Av in the same Bv and the same Sv (namely,--;
   line 53, after "A" delete "and".

Signed and Sealed this

Fifteenth Day of June 1982

[SEAL]

Attest:

GERALD J. MOSSINGHOFF

Attesting Officer          Commissioner of Patents and Trademarks